United States Patent [19]

Kawase et al.

[11] 4,195,903

[45] Apr. 1, 1980

[54] BINOCULAR MICROSCOPE WITH LENSES ROTATABLE IN THE PLANE OF OPTICAL AXES

[75] Inventors: Suminosuke Kawase, Ohmiya; Yoshihisa Uchiumi, Fujimi; Shinichi Nishimura, Ageo, all of Japan

[73] Assignee: Tokyo Kagaku Kikai Kabushiki Kaisha, Tokyo, Japan

[21] Appl. No.: 796,594

[22] Filed: May 13, 1977

[30] Foreign Application Priority Data

May 13, 1976 [JP] Japan ................... 51-53854

[51] Int. Cl.² ............................................. G02B 21/22
[52] U.S. Cl. ......................................... 350/36; 350/39
[58] Field of Search ........................... 350/39, 36, 254

[56] References Cited

U.S. PATENT DOCUMENTS

| 198,195 | 12/1877 | Finch | 350/39 |
|---|---|---|---|
| 409,927 | 8/1889 | Clements | 350/39 |
| 1,622,350 | 3/1927 | Sabel | 350/39 |
| 2,791,937 | 5/1957 | Leitz et al. | 350/39 |

*Primary Examiner*—Jon W. Henry
*Attorney, Agent, or Firm*—Stevens, Davis, Miller & Mosher

[57] ABSTRACT

Binocular microscope having a pair of converging optical paths, each including a magnification changing optical device which comprises two or more lens groups. The lens groups are rotatably mounted on the lens housing so that they can be alternately brought into alignment with the optical path for changing the magnification power.

10 Claims, 9 Drawing Figures

BINOCULAR MICROSCOPE WITH LENSES ROTATABLE IN THE PLANE OF OPTICAL AXES

The present invention relates to binocular microscopes and more particularly to such binocular microscopes having variable magnification powers.

Conventional Galileo type binocular microscopes include a pair of parallel optical paths, one for each of the eyes of the operator, said optical paths including optical lens systems adopted for adjusting the magnification powers. An object lens is provided in common for the pair of optical paths and the magnification adjusting lens systems are interconnected together so that the magnification powers in the pair of the optical paths are adjusted simultaneously. The Galileo type binocular microscopes are believed as being advantageous in that the object lens can be readily changed to obtain different magnification powers. However, in this type of microscopes, since the optical paths for both eyes of the operator are in parallel each other, the operator has to observe an object as if it were located infinitely distant from him although it is actually very near to him, so that it has been difficult for the operator to adjust the convergence of his eyes. The binocular microscope of this type is also disadvantageous in that the common object lens is bulky and heavy.

Another known type of binocular microscope includes a pair of optical paths which are each convergent toward the object. The microscope of this type presents no problem of adjusting the convergence of the operator's eyes as encountered in the Galileo type microscope, however, since the microscope includes object lenses for the optical paths which are oriented obliquely to the object, a complicated mechanism is required to enable replacement of the object lenses for the purpose of changing the magnification powers. Further, it has been very difficult to provide a mechanism for moving magnification adjusting lens systems in the pair of optical paths as a unit.

The present invention has therefore an object to provide a binocular microscope which does not have any problem of adjusting convergence of the operator's eyes while possessing freedom of changing the magnification power of the microscope.

Another object of the present invention is to provide, in a binocular microscope having a pair of converging optical paths, simple means for changing the magnification power.

A further object of the present invention is to provide a binocular microscope which has a pair of converging optical paths provided with interconnected means for changing the magnification powers of the optical systems in the paths.

According to the present invention, the above and other objects can be accomplished by a binocular microscope which comprises a first optical path defined by first object lens means, first magnification changing optical means and first telescopic optical means, and a second optical path defined by second object lens means, second magnification changing optical means and second telescopic optical means, said first and second optical paths being converged toward each other, each of said first and second magnification changing optical means having at least two lens means of different magnification power which are adapted to be brought alternately into alignment with the optical path, means interconnecting the first and second magnification changing optical means so that the lens means having the same magnification power are located simultaneously in the first and second optical paths.

In a preferable mode of the present invention, the magnification changing optical means comprises two lens groups having lens axes crossing each other whereby the lens groups can be located alternately in the associated optical path by simply rotating them about an axis which is perpendicular to the axes of the lens groups and passing through the intersection of the lens axes.

In order that the invention is more clearly understood, it will hereinafter be described in more detail with respect to preferred embodiments taking reference to the accompanying drawings, in which.

Figure 1:
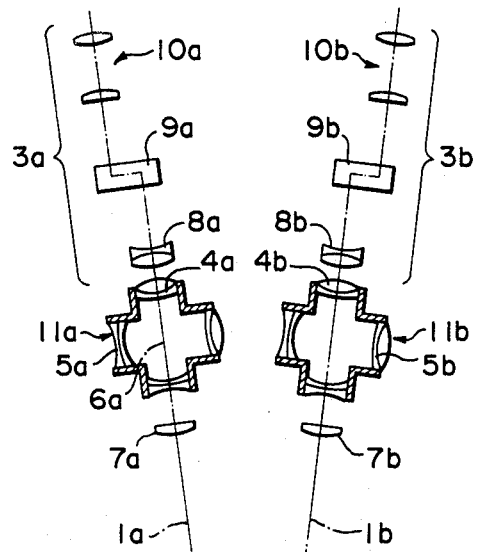
FIG. 1 is a schematical view of the optical system of the microscope in accordance with one embodiment of the present invention.

Referring now to the drawings, particularly to FIG. 1, the optical system of the binocular microscope embodying the features of the present invention comprises a first optical path 1a and a second optical path 1b which converge at the object 2. Along the first optical path 1a, there are disposed a first object lens 7a and a first telescopic optical system 3a including an object lens 8a, a prism assembly 9a and an eye lens 10a. Between the first object lens 7a and the object lens 8a of the first telescopic optical system 3a, there is disposed a first magnification changing optical device 11a which comprises a pair of lens groups 4a and 5a having optical axes perpendicularly crossing each other. The device 11a is arranged in the optical path 1a for rotation about an axis 6a which is perpendicular to the axes of the lens groups 4a and 5a and crosses perpendicularly the first optical path 1a. Thus, it will be noted that, by turning the device 11a about the axis 6a, the lens groups 4a and 5a can be alternately brought into alignment with the first optical path 1a. The lens groups 4a and 5a have different magnification powers so that the power of the whole optical system can be changed simply by rotating the device 11a.

Similarly, the second optical path 1b is defined by a second object lens 7b and a second telescopic optical system 3b comprising an object lens 8b, a prism assembly 9b and an eye lens 10b. Between the second object lens 7b and the object lens 8b of the second telescopic optical system 3b, there is disposed a second magnification changing device 11b which includes lens groups 4b and 5b in the same manner as the first device 11a. The lens groups 4b and 5b have the same magnification powers as the lens groups 4a and 5a, respectively.

Figure 2:
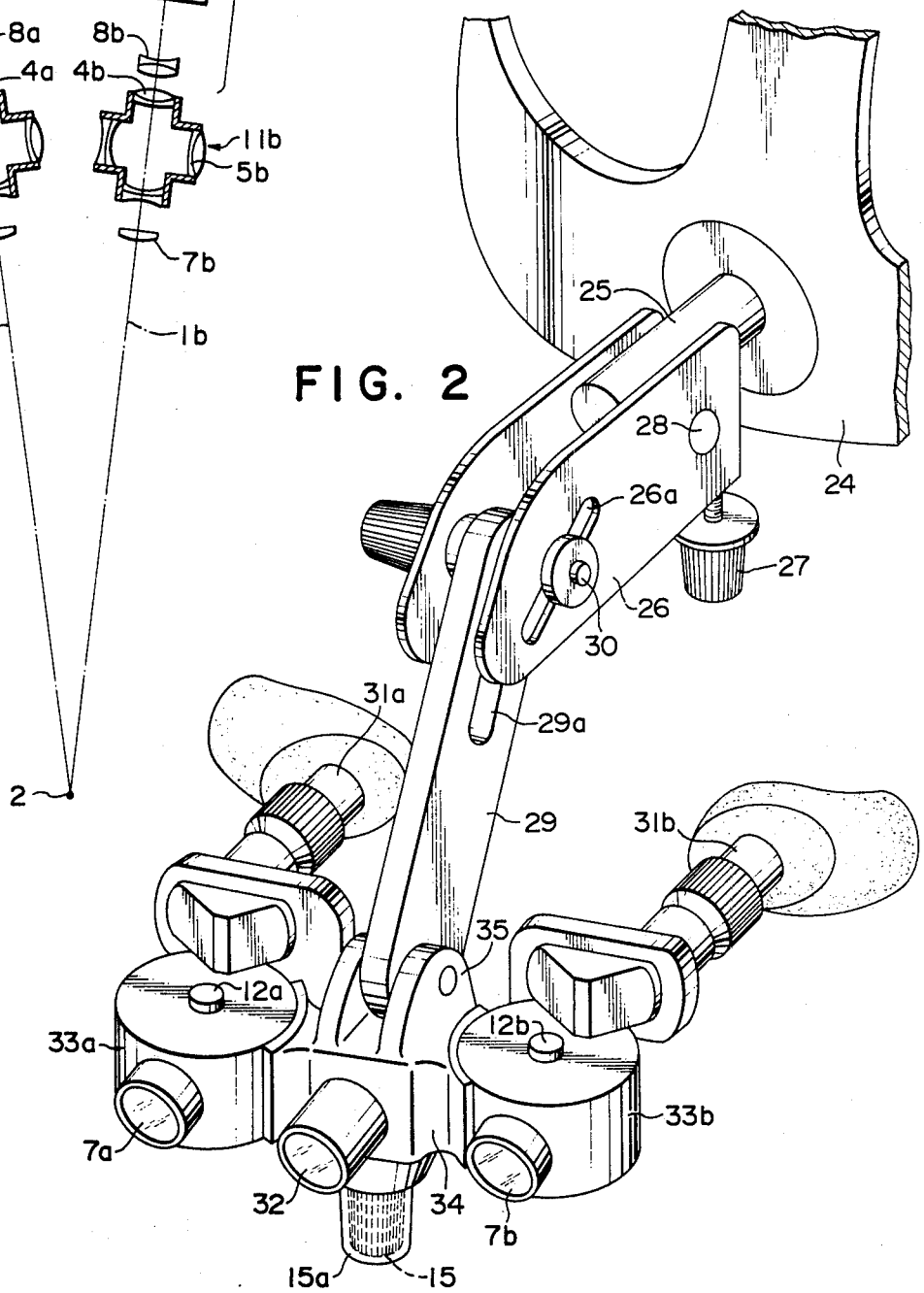
FIG. 2 is a perspective view of the microscope having the optical system shown in FIG. 1.
Figure 3:
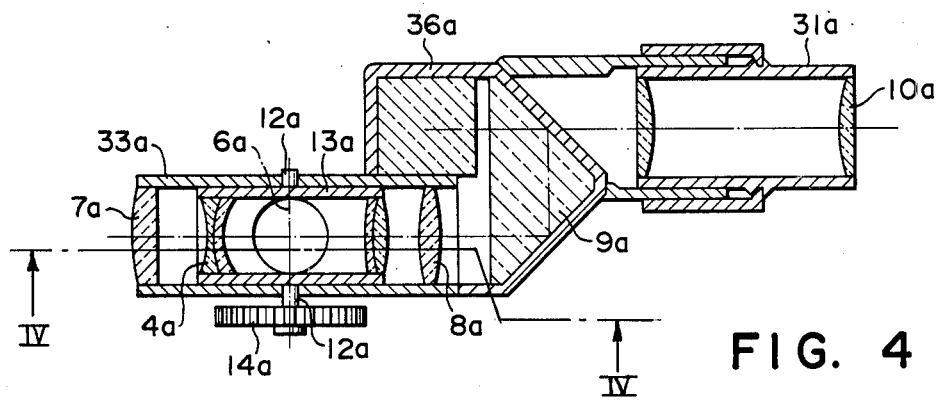
FIG. 3 is a vertical sectional view showing the arrangement of the optical elements along one of the optical paths in the binocular microscope.
Figure 4:
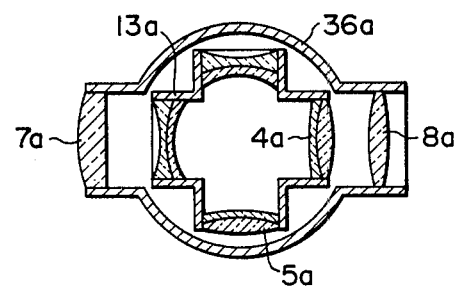
FIG. 4 is a sectional view taken along the line IV—IV in FIG. 3.

Referring now to FIG. 2, the binocular microscope shown therein includes a pair of lens housing 33a and 33b which are connected together by a lamp housing 34. In the lens housing 33a, there are disposed the first object lens 7a, the first magnification changing device 11a and the object lens 8a as shown in FIGS. 3 and 4. Similarly, the lens housing 33b carries the object lens 7b, the magnification changing device 11b and the object lens 8b. The lamp housing 34 has a pair of lugs 35 to which a lever 29 is mounted at its lower end.

The lever 29 is attached at its upper end to a pair of arms 26 which are mounted pivotably by a pin 28 on a shaft 25 extending forwardly from a forehead rest 24. The arms 26 each have one slot 26a while the lever 29 has a slot 29a and they are connected together by a tightening screw 30 passing through the slots 26a and 29a. The arms 26 carry at their free ends an adjustable stop screw 27 which is adapted to abut the lower surface of the shaft 25 to determine the angular positions of the arms 26.

Referring to FIG. 3, the lens housing 33a is mounted on a prism housing 36a which carries a set of prisms 9a for inverting the image. The eye lens 10a is mounted on an eyepiece 31a which is in turn mounted on the prism housing 36a for axial movement with respect to the housing 36a.

It will be noted in FIGS. 3 and 4, the magnification changing device 11a includes a rotatable housing 13a in which the aforementioned lens groups 4a and 5a are mounted. The housing 13a is mounted in the lens housing 33a by a pair of axially aligned shafts 12a for rotation about the axis 6a.

Figure 5:
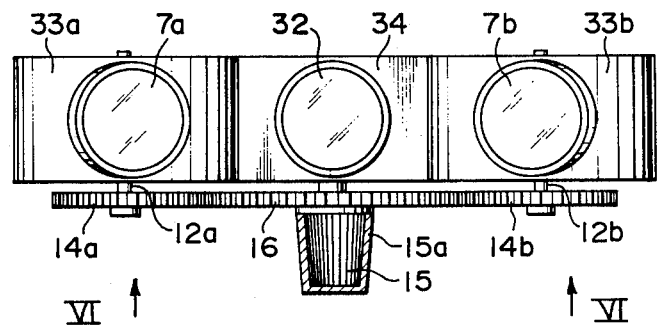
FIG. 5 is a fragmentary front view of the microscope showing the magnification changing mechanism.
Figure 6:
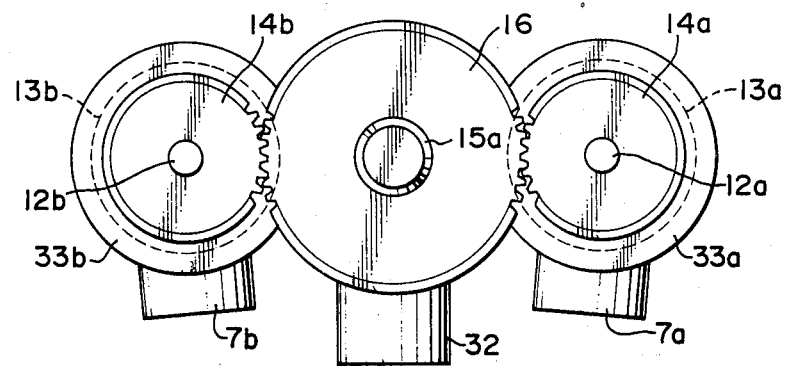
FIG. 6 is a view as seen along the line VI—VI in FIG. 5.

The lower shaft 12a carries a gear 14a which is in meshing engagement with a gear 16 which is carried on the lamp housing 34 and has a knob 15. The gear is also engaged with a gear 14b which is mounted on a shaft 12f for carrying a housing for the lens groups 4b and 5b. As shown in FIG. 5, the knob 15 may be covered with a replaceable cap 15a. It will be noted therefore that, by rotating the knob 15, the devices 11a and 11b are simultaneously rotated so that either of the lens groups 4a, 4b or 5a, 5b are simultaneously aligned with the optical paths 1a and 1b.

The lamp housing 34 carries a lamp or other illuminating device and the illuminating light is projected through a projecting lens 32.

Figure 7:
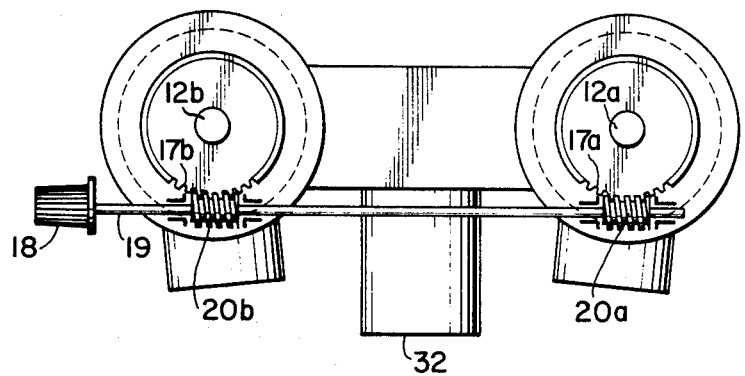
FIGS. 7 through 9 show different embodiments including modified magnification changing mechanisms.
Figure 8:
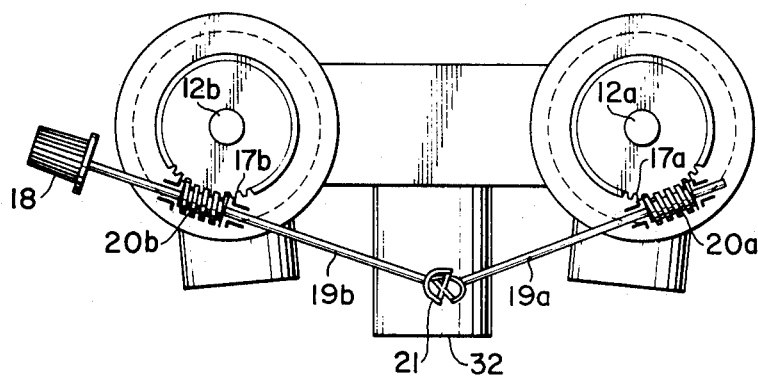
Figure 9:
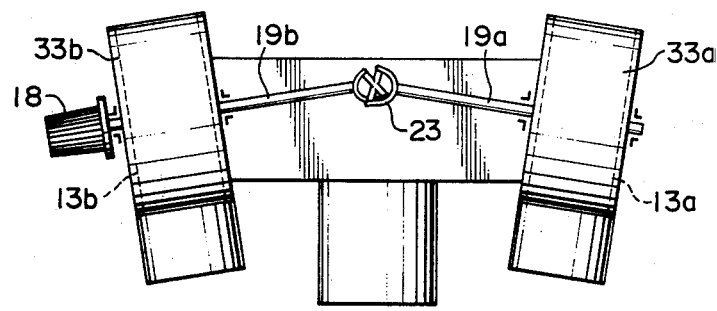

Referring now to FIG. 7, the shafts 12a and 12b carrying the housings 13a and 13b have gears 17a and 17b, respectively, which are mounted thereon. The gears 17a and 17b are meshed with worm gears 20a and 20b, respectively, which are provided on a shaft 19 having a knob 18 at one end. In the embodiment shown in FIG. 8, the pair of worm gears 20a and 20b are provided on shafts 19a and 19b which are connected together by a universal joint 21. In the embodiment shown in FIG. 9, the housings 13a and 13b are mounted in the lens housings 33a and 33b for rotation about horizontal axes and rotated by shafts 19a and 19b which are connected together by a universal joint 23.

From the above descriptions, it will be noted that simple means is provided for changing the magnification power in the microscope optical system having a pair of converging optical paths. Although the invention has been shown and described with reference to specific embodiments, it should be noted that the invention is in no way limited to the details of the illustrated arrangements but changes and modifications may be made without departing from the scope of the appended claims.

We claim:

1. Binocular microscope which comprises a first optical path defined by first object lens means, first magnification changing optical means and first telescopic optical means, and a second optical path defined by second object lens means, second magnification changing optical means and second telescopic optical means, said first and second optical paths converging toward each other, each of said first and second magnification changing optical means having at least two lens means of different magnification power which are adapted to be brought alternately into alignment with the optical path, said at least two lens means being mounted for rotation about axes which are substantially perpendicular to a plane containing both said optical paths, means interconnecting the first and second magnification changing optical means so that the lens means having the same magnification power are located simultaneously in the first and second optical paths.

2. Binocular microscope in accordance with claim 1 in which each of said first and second magnification changing optical means includes two lens groups having lens axes which cross each other whereby the lens groups can be located alternately in the associated optical path by simply rotating them about said axes of rotation.

3. Binocular microscope in accordance with claim 1 in which said interconnecting means includes intermeshing gears.

4. Binocular microscope in accordance with claim 1 in which said interconnecting means includes worm gear mechanisms.

5. Binocular microscope in accordance with claim 1 in which said interconnecting means includes rotatable shaft means for rotating the magnification changing optical means.

6. A binocular microscope comprising:
   a first optical path defined by first object lens means, first magnification changing optical means and first telescopic optical means;
   a second optical path defined by second object lens means, second magnification changing optical means and second telescopic optical means;
   said first and second optical paths converging toward each other, each of said first and second magnification changing optical means having at least two lens means of different magnification power;
   each said lens means being mounted in a rotatable housing, both said rotatable housings being mounted for rotation in a common plane which intersects said first and second optical paths, the rotation of each rotatable housing being about an axis which is perpendicular to its respective optical path so that one of said at least two lens means may be brought alternatively into alignment with its respective optical path;
   means interconnecting the first and second magnification changing optical means so that the lens means having the same magnification power are located simultaneously in the first and second optical paths.

7. The device of claim 6 including a gear wheel on each rotatable housing connected to rotate it.

8. The device of claim 7 including a common central gear intermeshed with said gear wheels.

9. The device of claim 7 including a common shaft connected to drive both said gear wheels.

10. The device of claim 7 including two separate shafts which are connected to drive said gear wheels and means interconnecting said shafts.

* * * * *